Jan. 14, 1958 G. H. BROWN, JR 2,819,526
CALCULATOR
Filed March 1, 1956

INVENTOR.
GEORGE H. BROWN, JR.
BY
ATTORNEY

United States Patent Office 2,819,526
Patented Jan. 14, 1958

2,819,526
CALCULATOR

George Harold Brown, Jr., Princeton, N. J., assignor to Radio Corporation of America, a corporation of Delaware Application March 1, 1956, Serial No. 568,937

1 Claim. (Cl. 33—1)

The invention relates to a calculator for use in the field of roentgenology.

Whenever an X-ray picture is made of a particular object, the resulting image of the object in the picture is always slightly larger in dimensions than the actual object under consideration. This is due to the distortion of the object in the picture caused by the divergency of the X-rays. When X-ray pictures are used for medical purposes, for example, it is often of particular importance that the actual or true dimensions of the object reproduced as an image on the X-ray picture be known. A simple way, and often the only way, to determine the dimensions of the object is to measure the dimensions of the image. In most cases, however, the image is sufficiently enlarged or distorted to prevent an accurate direct determination of the dimensions of the object by measuring the dimensions of the image with a ruler or similar device. It has been necessary in the past to make use of tables, charts and complicated mathematical computations to determine the dimensions of an object from an image of the object reproduced on the X-ray picture. In other words, the compensation of image distortion in an X-ray picture has required in the past the use of involved and tedious procedures.

It is an object of the invention to provide an improved calculator of simple construction that can be used to determine quickly and accurately the dimensions of an object from an image of the object produced on an X-ray picture.

Another object of the invention is to provide an improved calculator that can be laid directly on an X-ray picture and operated to determine quickly and accurately the dimensions of an object from an image of the object produced on the picture.

A further object of the invention is to provide an improved calculator that will automatically and directly give a fully compensated value of a given object dimension from an image of the object produced on an X-ray picture.

The above and other objects of the invention are accomplished by a calculator comprising a member having at least one straight side and upon which is mounted a ruler marked, for example, in centimeters. The ruler is attached to the member by means of a pivot located at the zero mark on the ruler. A number of guide lines are drawn in parallel on the surface of the member at a given angle with respect to the straight side of the member so that the first line passes through the pivot, the remaining lines being drawn so as to intersect the ruler at various points along the edge thereof. A scale in the form of an arc, the center of curvature of which is located at the pivot, is drawn on the surface of the member so that each point on the scale intersects the same point on the ruler. The scale is calibrated using the same measuring system as on the ruler, for example, in centimeters. The various points on the scale correspond to the various distances between an object and the image thereof which may be used in an X-ray system in which the source of X-rays is removed a particular distance from the image. To determine the actual dimension of an object, an operator places the side of the member from which the guide lines are drawn directly on the image of the object produced by the operation of the X-ray system. The member is positioned so that one end of the dimension of the image to be measured is adjacent to the guide line which passes through the pivot and zero mark on the ruler, the other end of the dimension of the image being located at a point adjacent to a second one of the guide lines. The ruler is then swung by means of the pivot until the ruler intersects the scale at a point corresponding to the known distance between the object and the image used in the particular operation of the X-ray system. By noting the particular guide line, other than the guide line which passes through the pivot, which is adjacent to an end of the dimension of the image under consideration, the operator then follows that particular guide line until it intersects the edge of the ruler. By noting the particular point of intersection, a direct and compensated reading can be automatically obtained from the ruler in centimeters of the dimension of the image corresponding to the actual dimension of the object from which the image was produced.

A more detailed description of the invention will now be given in connection with the accompanying drawing, in which.

Figure 1:
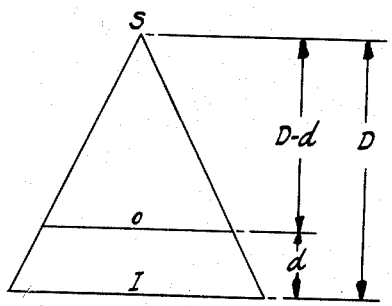
Figure 1 is a diagrammatic view of one problem that can be solved by the use of the invention.

Referring to Figure 1, there is shown a diagrammatic view of a problem encountered in the operation of an X-ray system. A distortion of the image produced on an X-ray film is inherent in the operation of the system and is caused by the divergency of the X-rays from the source S passing through the object O to the image I. The degree of distortion is dependent upon three factors; namely, the source or anode to film distance D, the object to film distance $d$ and the dimension of the object O under consideration. The value of D is arbitrary and depends upon the operator who decides the best distance to use in a particular application according to limitations of the X-ray equipment, grid radius, the exposure room arrangement and so on. The value of $d$ will depend upon the overall dimensions of the object O which is being studied. Various procedures may be followed to determine the value of $d$ and will be referred to in greater detail.

In order to determine the actual dimension of the object O from the dimension of the image I, it is necessary to find a correction factor CF which when multiplied by the value of the image dimension I will give the true object dimension. In any particular application, the values of D and $d$ are known. By solving similar triangles:

$$\frac{O}{I}=\frac{D-d}{D},\ OD-I(D-d)$$

$$O=\frac{I(D-d)}{D}=I\left(\frac{D-d}{D}\right)$$

Therefore, in any given situation the correction factor CF is the value $$\frac{D-d}{D}$$

Reference has already been made to the fact that the value of D is readily determined by a simple measurement. The value of $d$ will depend on the particular object O under consideration. As an example of one type of object O, reference is made to an article by R. P. Ball entitled "Roentgenography: Pelycephalometry" appearing in Medical Physics, vol. II, pages 940 to 947. Various methods of determining the value of $d$ in roentgenographic pelycephalometry are discussed by the author. Other procedures known in the art can be followed to determine the value of d when other types of objects are under consideration.

Figure 3:
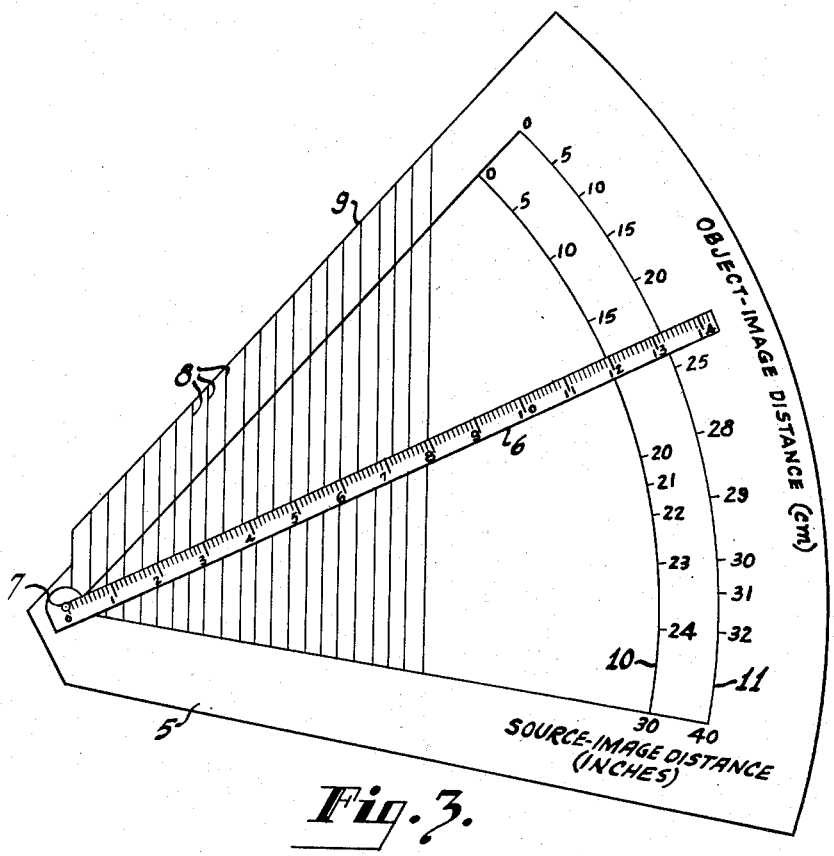
Figure 3 is a view of one embodiment of the invention.

An embodiment of the calculator of the invention is shown in Figure 3. The calculator consists of a member 5 which is approximately triangular in shape. However, the shape of the member 5 is not critical to the operation of the invention and may be altered to suit a particular application. The member 5 may be constructed as a piece of plastic backing or of other suitable material. A ruler or straightedge 6 marked in centimeters, which may also be constructed of plastic, is movably connected at the zero mark thereon to the member 5 by means of a pivot 7. In the embodiment shown in the drawing, the ruler 6 is connected to the member 5 near the vertex thereof. A number of parallel guide lines 8 are drawn at an angle with respect to one side 9 of the member 5.

It has already been shown in connection with Figure 1 that the correction factor CF equals the value of $D-d$ divided by the value of D. In constructing the calculator for use, the smallest value of D that will be encountered in an application of the invention is first determined. Thereafter, the largest value of d that will be encountered is determined. The extreme values of D and d may be determined by past experience according to the particular type of roentgenography in connection with which the calculator is intended for use. With the extreme values of D and d known, the correction factor CF can be determined by simple mathematical computations. The result of the computations will be the correction factor CF of the smallest numerical value that will be needed in the particular application. It is readily apparent from an examination of Figure 1 that the largest numerical value of the correction factor CF theoretically possible is one or unity which will occur when the object O and the image I on the X-ray picture are in the same position with respect to the source S. As the value of d increases, the image distortion increases and the value of the correction factor CF will assume a correspondingly smaller numerical value less than one. For a given value of a dimension of the object O the corresponding dimension of the image I will increase in value in an amount corresponding to the increase in the value of d.

Figure 2:
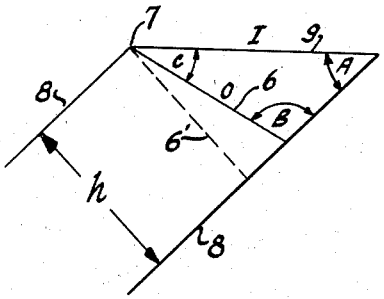
Figure 2 is a geometric diagram used in describing the principles of the invention.

Referring to Figure 2, there is shown a geometric diagram depicting the angular alignment of the guide lines 8 with respect to the side 9 of member 5 and the edge of ruler 6. By solving for the angles of the diagram:

$$\sin B = \frac{h}{O}, \sin A = \frac{H}{I}$$

$$h = O \sin B = I \sin A$$

$$\sin A = \frac{O}{I} \sin B$$

By assuming that angle $B=90°$, then the sine of angle $B=1$. Therefore, $$\sin A = \frac{O}{I} \text{ when angle } B = 90°$$

$$\frac{O}{I} = CF, \sin A = CF \text{ when angle } B = 90°$$

It may be seen by an examination of Figure 2 that the length of O as measured on the edge of ruler 6 is at a minimum value when the edge of ruler 6 is perpendicular to a guide line 8, indicated by the dotted line 6'. As the angle B increases or decreases in value, the length of O will increase or decrease a corresponding amount. The minimum value of O must correspond to the situation in which the maximum image distortion has occurred in the particular application and, therefore, the correction factor CF is at the smallest numerical value needed. This is true because the actual dimension of the object O will in every case decrease in value an amount corresponding to the amount of increase of image distortion. The sine of angle A will equal the smallest numerical correction factor CF to be needed when the edge of the ruler 6 is perpendicular to the guide line 8.

The guide lines 8 are each, therefore, drawn at an angle with respect to the edge 9 of member 5 such that the sine of the angle equals the smallest numerical value of the correction factor CF needed, the value of this correction factor CF having been determined in the manner previously described. The first guide line 8 is drawn so as to pass through the pivot 7 and the zero mark on ruler 6, the remaining lines 8 being spaced along the side 9 at regular distances. The distance between succeeding guide lines 8 will depend on the degree of accuracy desired. A scale 10 is then drawn on the member 5 in the form of an arc so that each point on the scale 10 intersects the same point on the ruler 6, the center of curvature of the arc being located at the pivot 7. The scale 10 is then calibrated in centimeters corresponding to various values of d which can occur in a system in which the value of D is that already determined. The formula $$O = I\left(\frac{D-d}{D}\right)$$

can be solved for each possible value of d. The value of I used in the formula can be an arbitrary one for this purpose and, for example, may be the distance in centimeters between the first and last of the guide lines 8 along the side 9 of member 5. The value of D or scource S to image I distance is known and is given as an example in Figure 3 of the drawing as 30 inches or 76.2 centimeters. The first value of d substituted in the formula is the largest value which is to be encountered and that which was used to determine the smallest numerical value of the correction factor CF and angle A. By substituting values for the different elements in the formula, the formula can be solved for the value of O in centimeters.

Assuming that the last guide line 8 is used to determine the arbitrary value of I, the ruler 6 is then swung by means of pivot 7 until the last guide line 8 intersects the marked edge of the ruler 6 at the value of O obtained by the solution of the formula. From the previous discussion, it is apparent that the marked edge of the ruler 6 will then be perpendicular to the guide lines 8. A mark placed on the scale 10 opposite the marked edge of the ruler 6 and identified by the value of d used in the formula. In the particular embodiment of the invention shown in Figure 3, this value of d was 24 centimeters. By substituting progressively smaller values of d in the formula and solving for the value of O, the position at which the ruler 6 intersects the scale 10 for each value of d can be readily determined and identified on the scale 10. The ruler 6 is merely moved to the various positions where the last guide line 8 intersects the marked edge of the ruler 6 at the various values of O according to the values of d substituted in the above formula. While scale 10 has been calibrated with a limited number of values of d for purposes of illustration, the scale 10 may be calibrated as completely as desired in a particular application.

Any number of additional scales representing other distances D between the source S and the image I may be drawn on the member 5. As an example, a second scale 11 is shown calibrated for various distances d between the object O and image I when the distance D between the source S and the image I equals 40 inches or 101.6 centimeters. This value of D is substituted in the above-mentioned formula. The formula is solved and scale 11 is calibrated for the various values of d in the same manner described in connection with the calibration of scale 10. It is to be noted by referring to the scales 10 and 11 that as the distance D between the source S and the image I increases, the distance d between the object O and image I also increases with respect to a particular amount of image distortion or correction factor determined by a particular setting of the ruler 6. This is true because the angle of divergency of the X-rays from the source S, as concerns the production of image distortion, decreases in an amount corresponding to an increase in the distance D between the source S and the image I. Thus, the largest value of $d$ on scale 10 resulting in a given correction factor CF on the basis of which the calculator shown in Figure 3 was constructed is 24 centimeters, while the largest value of $d$ on scale 11 resulting in approximately the same correction factor CF is 32 centimeters. In constructing a calculator according to the invention including more than one scale representing different values of D, it is, of course, important that each scale include the range of values of $d$ needed. To ensure that this will occur as a result of the calibration of the respective scales in the manner previously described, the smallest numerical value of the correction factor CF needed should be determined by using for the value of $d$ the largest value of $d$ to appear on the scale representing the smallest value of D to be used. For example, in the embodiment of the invention shown in Figure 3, the value of $d$ and of D used to determine the smallest numerical value of the correction factor CF needed would be 24 centimeters and 76.2 centimeters, respectively. Once the correction factor CF is determined in this manner, the guide lines 8 can be drawn and the different scales calibrated such that each scale includes the desired range of distances between the object O and the image I to be encountered using a particular distance between the source S and the image I.

In the operation of the invention, an operator places the member 5 directly on the surface of an X-ray picture. The member 5 is positioned so that one end of the dimension of the image I on the picture under consideration is adjacent the guide line 8 which passes through the pivot 7, the second end of the dimension of the image I being adjacent one of the guide lines 8 along the side 9 of member 5. The operator, having already determined the distance D between the source S and the image I and the distance $d$ between the object O and the image I chooses the appropriate scale 10 or 11 and sets the ruler 6 so that the marked edge of the ruler 6 is adjacent the particular value corresponding to the distance between the object O and the image I on the scale chosen. By following the guide line 8 adjacent the second end of the dimension of the image I until it intersects the marked edge of ruler 6, the operator can observe a reading directly from the ruler 6. If the second end of the dimension of the image I should fall between succeeding guide lines 8, the operator can obtain a reading on the marked edge of ruler 6 by extrapolation. The reading so obtained is the dimension of the image I under consideration automatically compensated for image distortion, and is, in fact, the actual value of the corresponding dimension of the object O from which the image I was produced.

A calculator of simple construction which can be used to determine quickly and accurately the actual dimension of an object from an image of the object produced on an X-ray picture is obtained. Provision is made for fully and automatically compensating for image distortion, eliminating the need for involved mathematical computations and other complicated procedures.

What is claimed is:

A calculator for automatically determining the actual dimension of an object from the corresponding dimension of an X-ray image of said object produced by the operation of a system of roentgenography, the dimension of said object being equal to the corresponding dimension of said image times a numerical correction factor, said calculator comprising, a backing member triangular in shape and having at least one straight side, a straightedge having graduations running from zero to increasingly higher numbers along its length pivotally linked to said member near the vertex of said member and at the zero point of said graduations, a plurality of guide lines drawn in parallel on said backing member each at an angle with respect to said side the sine of which equals said numerical correction factor, the first of said lines passing through said pivot and the remainder of said lines intersecting said straightedge at various spaced points along the length thereof, said member being adapted by said lines to be positioned along the dimension of said image under consideration so that one end of the dimension of said image is adjacent said first line and the other end of the dimension of said image is adjacent a second one of said lines, a plurality of scales in the form of arcs each with a center of curvature located at said pivot drawn on said member so that said arcs intersect said straightedge at different points along the length of said straightedge, each of said scales representing different distances between the source of X-rays and said image and being calibrated in values corresponding to various possible distances between said object and said image when the respective distances between said source and said image are used, said straightedge being arranged to be set by means of said pivot to intersect said scale representing the distance between said source and said image used in said system at a value corresponding to the distance between said object and said image used when said image was made, whereby the actual dimension of said object corresponding to the dimension of said image under consideration can be determined by following said second guide line to the point of intersection with said straightedge and observing the graduations on said straightedge adjacent said point of intersection.

References Cited in the file of this patent

UNITED STATES PATENTS

| 748,566 | Pierce | Dec. 29, 1903 |
| 1,665,527 | Brinkman | Apr. 10, 1928 |
| 2,465,481 | Reiche | Mar. 29, 1949 |

FOREIGN PATENTS

| 121,240 | Great Britain | Dec. 12, 1918 |
| 254,351 | Great Britain | July 5, 1926 |

OTHER REFERENCES

Pages 2 and 3 of brochure entitled "Miscellaneous Radiographic Supplies," General Electric X-Ray Corporation, Pub. 7E-446. Ball Calculator, Chicago, Ill.

UNITED STATES PATENT OFFICE

Certificate of Correction

Patent No. 2,819,526            January 14, 1958

George Harold Brown, Jr.

It is hereby certified that error appears in the printed specification of the above numbered patent requiring correction and that the said Letters Patent should read as corrected below.

Column 2, line 55, for "$OD-I(D-d)$" read —$OD=I(D-d)$—; column 3, lines 50 and 51, for $$\sin A = \frac{H}{I} \qquad \text{read} \qquad \sin A = \frac{h}{I}$$

column 4, line 45, after "mark" insert —is—.

Signed and sealed this 18th day of March 1958.

[SEAL]

Attest:
KARL H. AXLINE,
*Attesting Officer.*

ROBERT C. WATSON,
*Commissioner of Patents.*